United States Patent [19]

Lynch

[11] Patent Number: 4,915,022

[45] Date of Patent: Apr. 10, 1990

[54] VENT ASSEMBLIES

[76] Inventor: Gary M. Lynch, M/S 1020, Fernvale Queensland, Australia, 4305

[21] Appl. No.: 241,043

[22] Filed: Sep. 6, 1988

[30] Foreign Application Priority Data

Sep. 8, 1987 [AU] Australia .................................. PI4214

[51] Int. Cl.⁴ .......................... A01G 15/00; F24F 7/02
[52] U.S. Cl. ......................................... 98/42.2; 47/17; 98/42.16
[58] Field of Search ...................... 47/17; 98/32, 42.01, 98/42.16, 42.2, 42.21, 42.22

[56] References Cited

U.S. PATENT DOCUMENTS 3,028,872 4/1962 Cresswell ........................ 98/42.16 X

FOREIGN PATENT DOCUMENTS

| 2209646 | 9/1973 | Fed. Rep. of Germany | 49/42.01 |
| 578093 | 9/1924 | France | 47/17 |
| 84944 | 5/1982 | Japan | 98/32 |

Primary Examiner—Harold Joyce
Attorney, Agent, or Firm—Bauer & Schaffer

[57] ABSTRACT

A vent assembly which can be mounted to plant nursery buildings of the type which include a plurality of arcuate roof frame members covered by a fabric material, such as a plastic film, the vent assembly having at least one pair of sawtooth profiled frames which may be bolted or otherwise connected to the building roof frame members to be upstanding therefrom. A pair of members extending longitudinally of the building are connected to upper and lower parts of the vertical portions of the sawtooth frames to define a vent opening which may be opened and closed by means of a rollerblind.

6 Claims, 4 Drawing Sheets

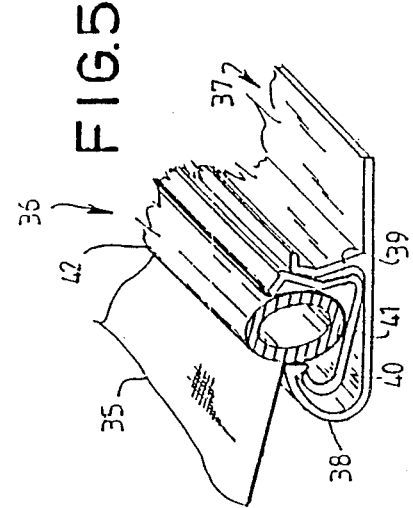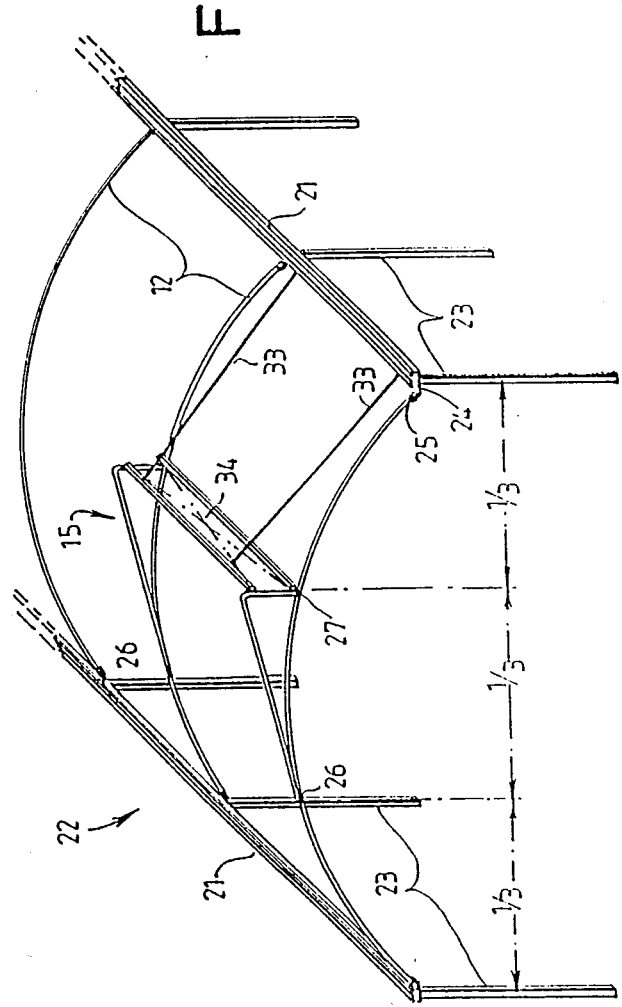

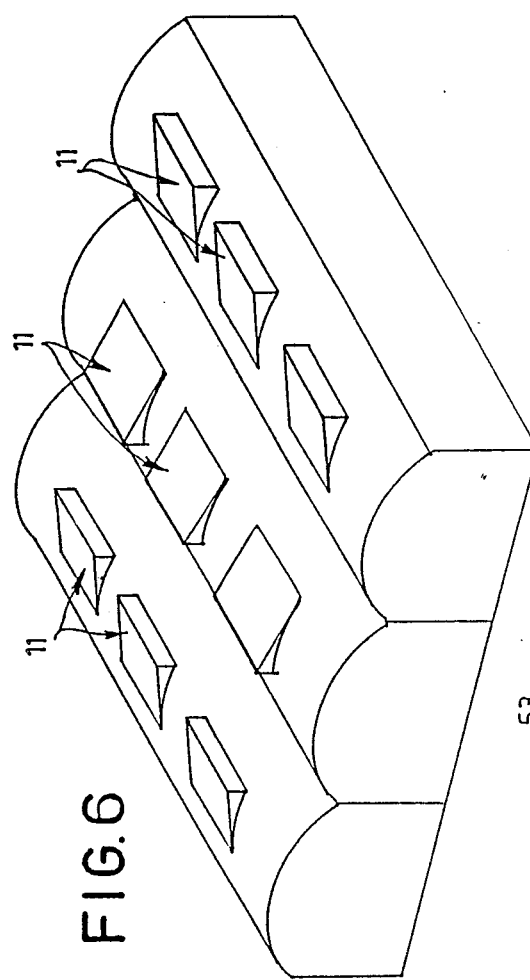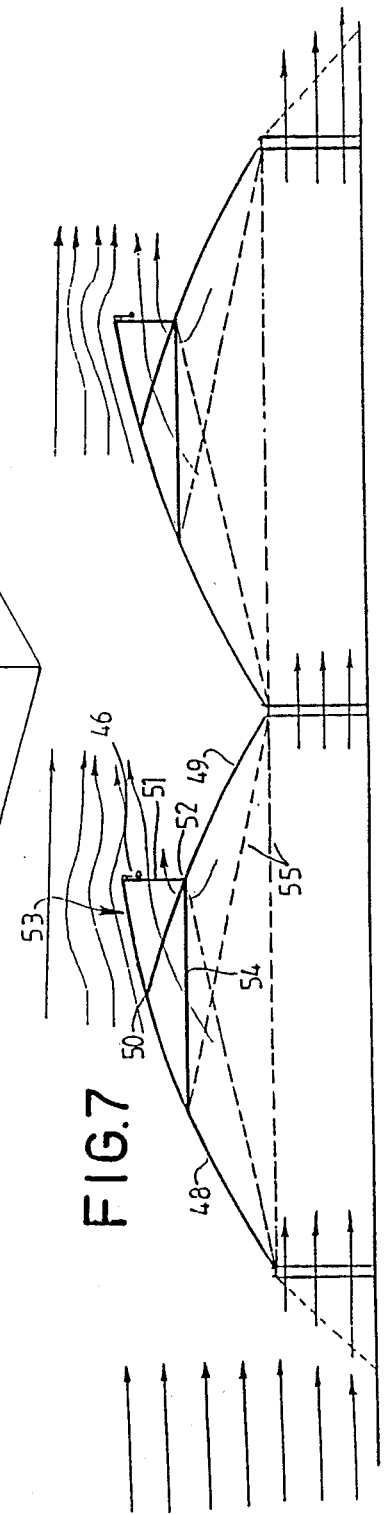

VENT ASSEMBLIES

BACKGROUND OF THE INVENTION

1. Field of the Invention

This invention relates to improvements to vent assemblies and in particular to vent assemblies for agricultural type buildings such as plant nursery buildings.

2. Description of the Related Art

It is important in plant nursery buildings to employ some form of ventilation arrangement so as to permit venting of hot air from the building and to maintain the temperature within the building within a desired range for efficient propagation and growing purposes. A number of different types of venting arrangements have been proposed for such buildings. Often such arrangements for example that shown in my U.S. Pat. No. 4,672,889 include a framework supporting pivotal flaps which may be raised or lowered to permit or to shut off venting of the building. Generally such arrangements are constructed during erection of the building and do not lend themselves readily to adaption to existing buildings. Furthermore, the venting efficiency of such known arrangements is not always sufficient to achieve desired circulation of air throughout the building. Another disadvantage associated with such venting arrangements is cost.

BRIEF SUMMARY OF THE INVENTION

The present invention aims to overcome or alleviate one or more of the above disadvantages by providing an improved vent assembly particularly but not exclusively suited to use with igloo type plant nursery buildings which may be readily adapted for use with existing buildings or fitted to buildings during the construction thereof. The present invention may also be applied to multiple igloo constructions in various attitudes to allow for a desired circulation of air through such buildings. Other objects and advantages of the invention will become apparent from the following description.

With the above and other objects in view, the present invention resides broadly in a vent assembly for buildings of the type having a roof frame defined by a plurality of spaced apart generally arcuate roof frame means extending between opposite sides of said building, said vent assembly including a pair of side wall portions of generally sawtooth configuration adapted to be secured to respective said roof frame means to extend upwardly therefrom, a top wall portion and a front wall portion of generally upright form and adapted to face to one side of said building and there being provided means for opening said front wall portion whereby to permit passage of air therethrough.

Suitably the side wall portions include respective perimeter frame portions defining the sawtooth profile of the side wall portions and the frame portions are adapted to be secured at opposite ends by bolting or by other fastening arrangement to the roof frame means. The frame portions are preferably covered with the same fabric material which forms the cover for the roof of the building. For this purpose, respective connections are provided on the perimeter frame portions to enable the fabric material to be secured thereto.

Suitably the side frame portions are interconnected by a longitudinally extending member fixed to the upper ends of the perimeter frame portions and a further longitudinally extending frame member may be secured to the frame portions at or adjacent their connection to the roof frame means. The area between the respective longitudinally extending members forms the vent opening for the building and this opening may be selectively opened and closed by the provision of any suitable closure arrangement which may for example be in the form of a roller blind.

The top wall portion of the vent assembly which is defined by the inclined parts of the vent side frame portions is preferably covered by a covering which comprises an extension of the fabric material roof covering of the building and is secured to the side frame portions.

A vent assembly of the above described type may extend for the full length of a building or alternatively a building may be provided with a number of such vent assemblies which may be arranged in any suitable pattern and in opposed directions to obtain a desired air circulation through the building.

The fabric material covering for the building roof frame and vent preferably comprises a plastic film, a woven synthetic material or a shade cloth.

BRIEF DESCRIPTION OF THE DRAWINGS

In order that the invention may be more readily understood and put into practical effect reference will now be made to the accompanying drawings which illustrate preferred embodiments of the invention and where:

FIG. 3 is a part perspective view showing details of the frame of the building and vent assembly;

FIG. 5 illustrates a preferred connector for connecting the covering material to the roof or vent assembly of the building;

FIG. 6 illustrates an alternative arrangement of vent assemblies according to the invention on a multibay building; and FIG. 7 illustrates in side view, a further two-bay building incorporating vent assemblies according to the invention.

DETAILED DESCRIPTION OF THE DRAWINGS

Figure 1:
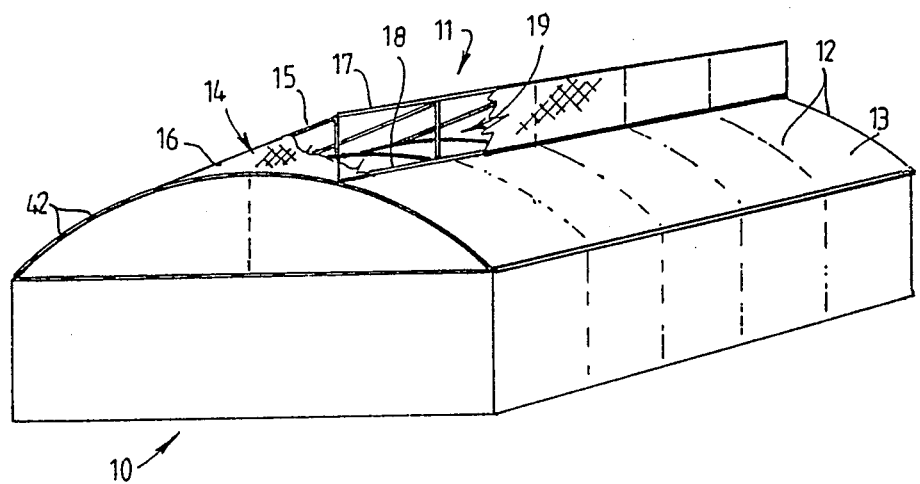
FIG. 1 is a partly cut away perspective view of a building incorporating a vent assembly according to the present invention.

Referring to the drawings and firstly to FIG. 1 there is illustrated a building 10 fitted with a vent assembly 11 according to the present invention which in this embodiment extends the full length of the building 10. As is apparent the building 10 is an "igloo" style building which includes a plurality of spaced apart arcuate roof frame members 12 which extend between opposite sides of the building 10 and support the roof covering 13 which may be any suitable fabric such as a plastic film or sheeting. The vent assembly 11 includes a pair of side wall portions 14 each of which is of a generally sawtooth configuration and which is defined by a perimeter frame 15 having the general profile of a sawtooth and which is covered with a suitable fabric material 16.

In the embodiment of FIG. 1, a plurality of aligned frames 15 of similar form are provided, each being secured to a respective arcuate frame member 12 to be upstanding therefrom. The upper portions of the respective frames 15 are interconnected by a longitudinally extending member 17 and a further longitudinally extending member 18 is provided at the junction between respective frames 15 and arcuate roof members 12. The region between the respective longitudinal members 17 and 18 and end frames 15 defines a vent opening 19 which may be closed and opened in any suitable manner, one example of which is described below.

Figure 2:
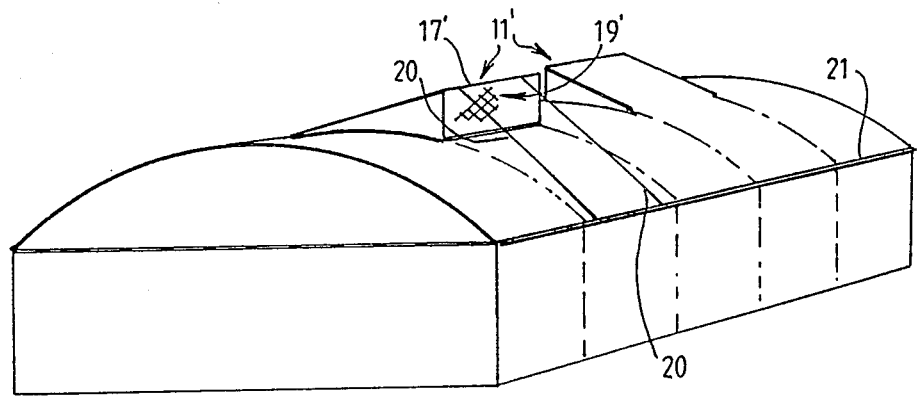
FIG. 2 is a perspective view of a building incorporating an alternative form of vent assembly according to the invention.

FIG. 2 illustrates an alternative embodiment of the invention wherein respective oppositely facing longitudinally spaced vent assemblies 11 are provided. These vent assemblies 11" are of similar constructional form to those shown in FIG. 1 with the addition of bracing cables 20 which extend from the longitudinally extending frame members 17' to side gutter members 21 of the building to brace the vent assemblies 11' against wind loadings. It will be apparent that either or both vent assemblies 11' of the building of FIG. 2 may be opened at 19' to permit the escape of hot air depending upon the direction in which any wind is blowing.

Figure 4:
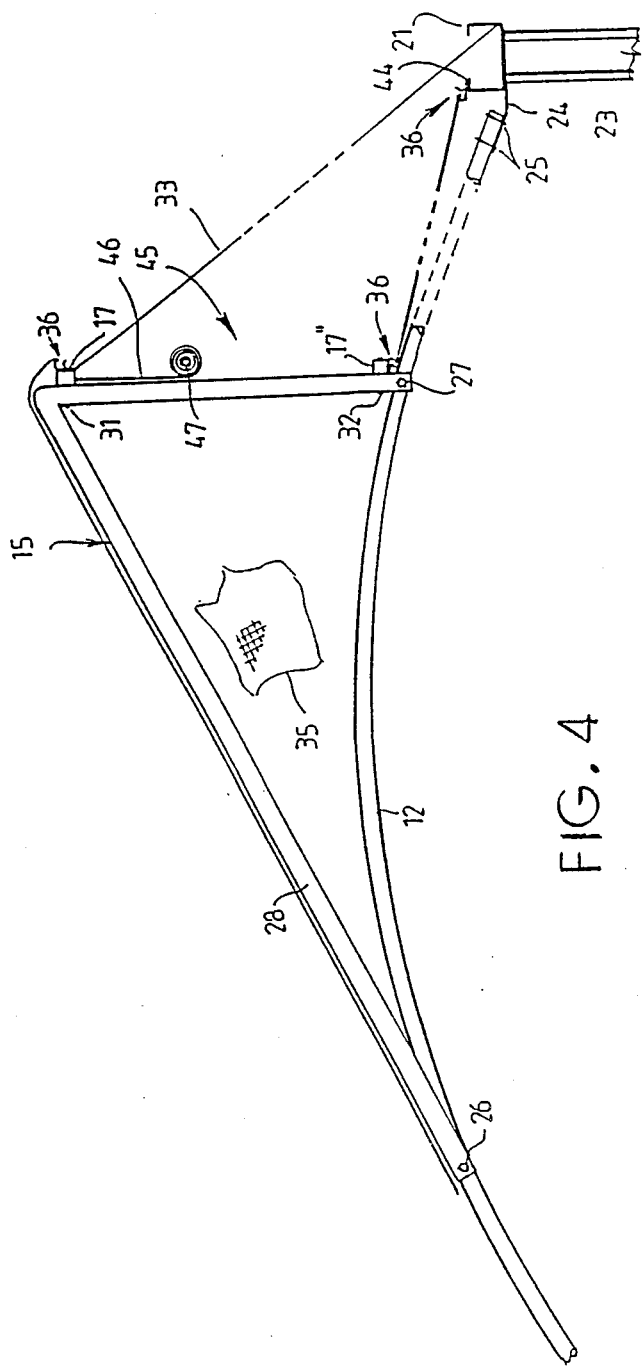
FIGS. 4A, 4B, 4C, 4D and 4E illustrate alternative means for connecting the sheet covering material in the vent and roof frame members.
FIG. 4F illustrates an alternative connection arrangement between the vent and roof frame members.

FIGS. 3 and 4 illustrate further constructional details of the vent assemblies 11 and 11' according to the present invention. As shown, the building 22 to which the vent assemblies 11 or 11' are fitted suitably includes two spaced parallel rows of upstanding members 23 which support at their upper ends the respective longitudinally extending channel sectioned members 21 which define gutters for the building 22. Extending between the respective gutter members 21 are the generally arcuate roof frame members 12 which are secured to the gutter members 21 and/or upstanding members 23 by brackets 24 and U-clamps 25. Suitably the roof frame members 12 are of tubular pipe form.

The sawtooth configured vent frame members 15 are secured at their opposite ends to the respective roof frame members 12 by simple through bolting at 26 and 27. Alternatively or additionally, the ends of the top portion 28 of the sawtooth frame members 15 may be flattened and shaped to the upper curved surface of the roof frame members 12 as at 29 and the respective shaped ends 29 may be secured to the roof frame members by rivets 30 or other fasteners.

The respective upper and lower longitudinally extending members 17 and 17" are secured to the upright portions of the sawtooth frame members 15 as illustrated by through bolting or by means of U-bolts at 31 and 32 and that the lower member 17" is spaced from the adjacent arcuate roof members 12 to permit connection of roof fabric in the manner described below. For bracing purposes, respective bracing cables or wires 33 may be provided to extend between the members 17 and adjacent gutter members 21 and if desired, cross bracing 34 (shown in dotted outline) may be provided to stiffen and support the vent assemblies 11 or 11' in the longitudinal direction.

The sides and top of the vent assembly 11 are suitably covered by a fabric covering 35 such as plastic sheeting as is the remainder of the roof frame assembly of the building and for this purpose respective frame portions of the vent assembly 11 or 11' (and roof frame assembly) may be provided with a plurality of connectors 36 of the type shown in FIG. 5.

Each connector 36 comprises an extruded base member 37 which includes a first arcuate flange 38 and a second elbow flange 39 defining therebetween a locking recess 40. An extruded locking member 41 is adapted to be located in the recess 40 and locked therein by cooperation with the respective flanges 38 and 39 by means of a resilient or flexible member 42 which in this instance comprises lengths of hose and preferably a plurality of short such lengths. The fabric covering 45 as shown passes about the member 42 to be sandwiched between the member 42 and flange 38 and locking member 41 and thereby be retained connected to the base member 37.

The connectors 36 may be secured to the frames of the vent assembly 14 and roof 11 to extend therealong, in many different configurations, examples of such being shown at A,B,C,D, and E in FIG. 4.

At A, pairs of connectors 36 are secured in overlapping relationship by common fasteners 43 to the vent frame portions 28 to connect the fabric for the top and the side of the vent assembly 11 to the frame member 15. A similar arrangement as shown at B may be provided on the roof frame member 12 adjacent the vent assembly 11 to connect the side fabric of the vent assembly and roof fabric of the building to the member 12.

In an alternative arrangement shown in at C, single elongated connectors 36 may be provided, with the fabric of the top of the vent assembly being sandwiched between the base members 37 of the connectors 36 and frame member 28 whilst the side fabric thereof is connected by the connectors 36 to the frame member 28. A similar arrangement as shown at D may be used on the roof frame member 15 with the vent side fabric being sandwiched between the base members 37 of the connectors 36 and frame member 15.

The remainder of the roof may be covered by fabric using similar pairs of spaced apart connectors 36 as shown at E whilst in the region between the vent assembly 11 and gutter sections 21, respective elongated connectors 36 are provided on the underside of the frame member 17", and on a gutter flange 44 with the side edges being connected to the respective roof frames 15 by further spaced connectors 36.

It will be apparent that the fabric covering over the roof members 12 and vent frames 15 will define a vent opening 45 for exit of air from the building 10. The opening 45 is preferably controlled by means of a curtain 46 of roller-blind form which is secured at one end to the upper frame member 17 and at its opposite end to a roller 47. Conventional means such as a cord wound about the roller 47 and pulleys may be provided so that the curtain 46 may be raised or lowered to open and close the vent opening 45 to vary the exit of hot air from the building.

Preferably the vent assembly 11 is located in the central one-third portion of the building widthwise to ensure efficient transfer of wind loading to the side gutter frame members 21 and thence to the ground. That is the distance from the connection points between the vent frames 15 and arcuate members 12 and adjacent gutter members 21 is substantially the same as the distance between the connection points of the frames 15 to the arcuate members 12. Thus as the vent assembly extends over the centre of the building, a strong aerodynamic structure results. In the above frame portions 28 are disposed substantially tangential to the roof frame members 12. This ensures improved aerodynamic characteristics in the building and attached vent assembly.

Another advantage of the both of the above arrangements is that any snow build up in the region of the gutters 21 between adjacent building bays will not block the vent openings 45.

The frame members 15 may be of any suitable form but preferably they are of the same form as the roof members 12. Suitably the members 17 are of any form such as hollow box sections and the connectors 36 may be secured in position by means of TEK screws or other suitable fasteners known in the art.

FIG. 6 illustrates yet an alternative form of building wherein a plurality of vent assemblies 11 are provided with the vent openings 45 being arranged in opposing and staggered relationship for maximum efficiency of air circulation. Of course many other configurations of vent assemblies may be applied to buildings to obtain the desired air circulation therethrough.

In yet an alternative configuration, as shown in FIG. 7 the vent assembly may form part of the roof of a building. In this embodiment, the roof frame members are split into two parts 48 and 49 interconnected at a point 50 substantially central widthwise of the building with the part 48 being extended and either formed in the manner of the vent frames of FIG. 4 or provided with an additional vertical connecting element 51 connecting the free end of the part 48 with the part 49 at 52 to define a sawtooth vent 53 of similar form to that shown in FIGS. 1 to 4. This vent 53 may be opened or closed as in the previous embodiments.

Preferably in this arrangement, extra bracing is provided by the horizontal members 54 extending between the interconnection points 50 and 52 and further cable bracing 55 as shown in dotted outline in FIG. 7 may be provided to ensure that the structure is rigid. Furthermore, the external frame members of the roof and vent are covered in a fabric such as a plastic film in a similar manner to that as shown in FIGS. 1 to 5 using the fasteners 36.

Either vent assembly provides an efficient means for removing hot air from buildings so as to ensure that conditions within such buildings can be controlled as required to suit particular purposes.

I claim:

1. A vent assembly adapted to be mounted to a building of the type having a roof defined by a plurality of spaced apart arcuate roof frame members, said vent assembly including a pair of opposite end frame members defining the general profile of a sawtooth, said end frame members being adapted to be mounted, in longitudinal alignment, to respective said roof frame members to extend upwardly therefrom, each said frame member including a first inclined portion adapted to be secured at one end to said roof frame member and extend generally tangentially thereto, and a second generally upright portion adapted to be secured at its lower end to said roof frame member, elongated frame means adapted to extend longitudinally of said building and secured to the respective said end frame members adjacent the junction of said first and second portions, sheet material covering said end frame portions so as to define a vent opening between said second portions, and roller screen means secured to said elongated frame means and selectively movable between a first position wherein said screen means substantially closes said vent opening and a second opening position wherein said screen means permits air to be vented through said opening.

2. A vent assembly according to claim 1, wherein said arcuate roof frame members of said building extend between respective elongated side members at the opposite sides of said building and wherein bracing means extend from said elongated frame means to the adjacent side elongated member to brace said vent assembly.

3. A vent assembly according to claim 2 and including further elongated frame means secured to said second portions of said end frame members adjacent the connection of said second portions to said arcuate roof frame members and wherein roof covering for said building extends between said further elongated member and the adjacent said side member of said building.

4. A vent assembly for buildings of the type having a roof frame defined by a plurality of spaced apart generally arcuate roof frame means extending between opposite sides of said building, each said roof frame means including first and second roof frame members extending from opposite sides of said building and intersecting and being interconnected at a point substantially centrally of said building, said first frame member extending beyond said intersection point to define top frame means for said vent assembly and further frame means extending from said extending portion of said first member in a substantially vertical plane to be connected to said second roof frame member to define with said extended portion of said first frame member, a side frame for said vent assembly of generally sawtooth configuration and wherein the region between said further frame means defines a vent opening for said building.

5. A vent assembly according to claim 4, including roller screen means for opening and closing said vent opening.

6. A building of the type including a roof frame assembly defined by a plurality of spaced apart generally arcuate roof frame members extending between respective opposite side members, and a vent assembly mounted to said building, said vent assembly including a pair of opposite end frame members defining the general profile of a sawtooth, said end frame members being mounted, in longitudinal alignment, to respective said roof frame members to extend upwardly therefrom, each said end frame member including a first inclined portion secured at one end to a said roof frame member and extending generally tangentially thereto, and a second generally upright portion secured at its lower end to said roof frame member, sheet material covering said end frame members and the region of said vent assembly between said first portions so as to define a vent opening between said second portions, screen means selectively movable between a first position wherein said screen means substantially closes said vent opening and a second open position wherein said screen means permits air to be vented through said opening, and wherein said vent assembly is centrally disposed widthwise of said building, such that the distance between the points of securement between said first and second portions and said roof frame members and the adjacent said side members is substantially the same as the distance between said points of securement.

* * * * *